(12) United States Patent
Ragunathan et al.

(10) Patent No.: US 12,460,611 B2
(45) Date of Patent: Nov. 4, 2025

(54) FUEL INJECTOR HAVING MULTIPLE ROWS OF SPRAY HOLES WITH DIFFERENT CROSS-SECTIONAL SHAPES FOR FLOW MODULATION

(71) Applicant: Cummins Inc., Columbus, IN (US)

(72) Inventors: Srivathsan Ragunathan, Columbus, IN (US); Joshua R. Krems, Columbus, IN (US); Divakar Rajamohan, Columbus, IN (US); Karthik Ramisetty, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 225 days.

(21) Appl. No.: 17/909,128

(22) PCT Filed: Feb. 11, 2021

(86) PCT No.: PCT/US2021/017520
§ 371 (c)(1),
(2) Date: Sep. 2, 2022

(87) PCT Pub. No.: WO2021/178118
PCT Pub. Date: Sep. 10, 2021

(65) Prior Publication Data
US 2023/0101391 A1    Mar. 30, 2023

Related U.S. Application Data

(60) Provisional application No. 62/983,999, filed on Mar. 2, 2020.

(51) Int. Cl.
*F02M 61/18* (2006.01)
(52) U.S. Cl.
CPC ...... *F02M 61/1833* (2013.01); *F02M 61/182* (2013.01); *F02M 61/184* (2013.01)

(58) Field of Classification Search
CPC .............. F02M 61/10; F02M 61/1806; F02M 61/1813; F02M 61/182; F02M 61/1826;
(Continued)

(56) References Cited

U.S. PATENT DOCUMENTS 6,161,780 A    12/2000  Sugimoto
9,957,939 B2 *  5/2018  Mahato .............. F02M 61/1833
(Continued)

FOREIGN PATENT DOCUMENTS

WO    2018103917 A1    6/2018

OTHER PUBLICATIONS

International Search Report and Written Opinion for International patent application No. PCT/US2021/017520, filed Feb. 11, 2021, mailed Apr. 27, 2021.

*Primary Examiner* — Hai H Huynh
*Assistant Examiner* — Johnny H Hoang
(74) *Attorney, Agent, or Firm* — Taft Stettinius & Hollister LLP

(57) ABSTRACT

A nozzle body of a fuel injector includes a proximal end, a distal end spaced apart from the proximal end, and at least one spray hole positioned at the distal end. The at least one spray hole includes an inlet having a first cross-sectional shape and an outlet having a second cross-sectional shape different from the first cross-sectional shape. In other embodiments, the nozzle body has a first row of spray holes and a second row of spray holes, and a cross-sectional shape of spray holes in the first row is different from the cross-sectional shape of spray holes in the second row.

20 Claims, 9 Drawing Sheets

(58) Field of Classification Search
CPC ............. F02M 61/184; F02M 61/1846; F02M 61/1833; F02B 23/0669; F02B 2275/14; Y02T 10/12; B05B 1/34; B05B 1/3405
USPC ....... 123/470, 472, 476, 479, 482, 487, 488, 123/490; 239/533.12
See application file for complete search history.

(56) References Cited

U.S. PATENT DOCUMENTS

| | | |
|---|---|---|
| 2002/0158152 A1 | 10/2002 | Hockenberger |
| 2004/0011890 A1 | 1/2004 | Heinecke |
| 2004/0237929 A1* | 12/2004 | Cavanagh ............ F02M 61/182 123/299 |
| 2007/0181094 A1 | 8/2007 | Katou |
| 2008/0142622 A1* | 6/2008 | Gray .................... F02M 61/182 123/445 |
| 2015/0377197 A1* | 12/2015 | Yao .................... F02M 51/0603 239/408 |
| 2016/0215745 A1 | 7/2016 | Koeninger et al. |
| 2016/0319792 A1 | 11/2016 | Agresta et al. |
| 2016/0356253 A1* | 12/2016 | Noguchi ............ F02M 61/1853 |
| 2017/0218909 A1* | 8/2017 | Mahato ............. F02M 61/1833 |
| 2018/0080422 A1* | 3/2018 | Mahato ................. F02M 61/18 |
| 2019/0003438 A1 | 1/2019 | Ginter et al. |
| 2022/0056874 A1* | 2/2022 | Phillips ................ F02M 61/163 |
| 2023/0025671 A1* | 1/2023 | Moran ................. F02M 61/168 |

\* cited by examiner

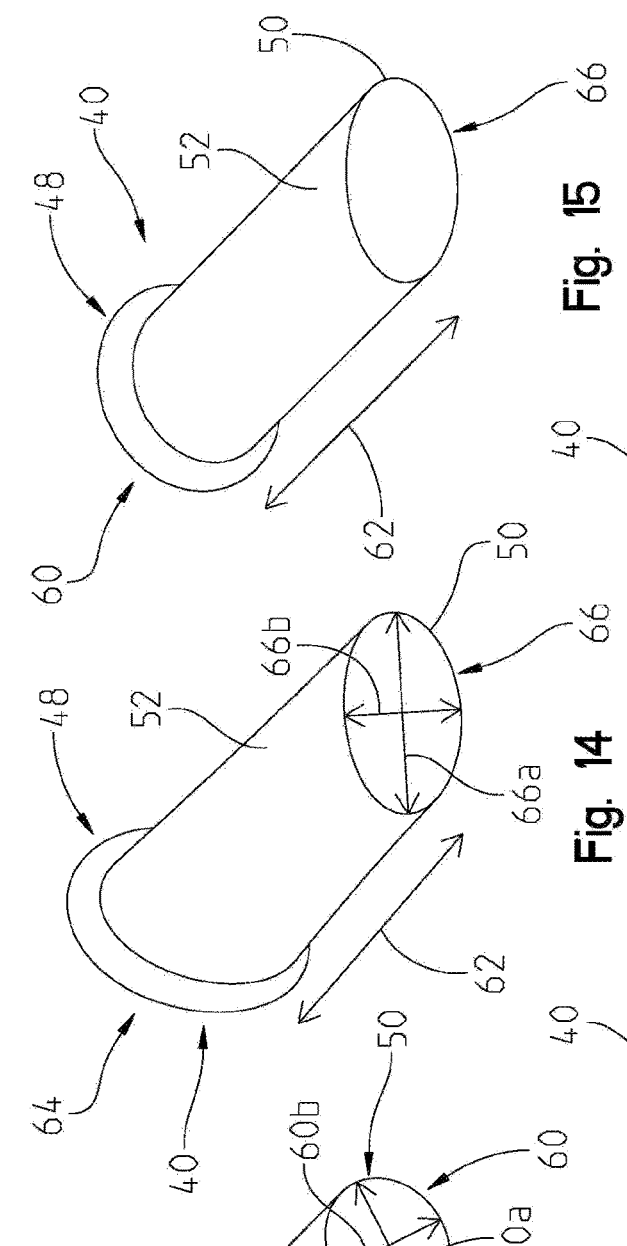
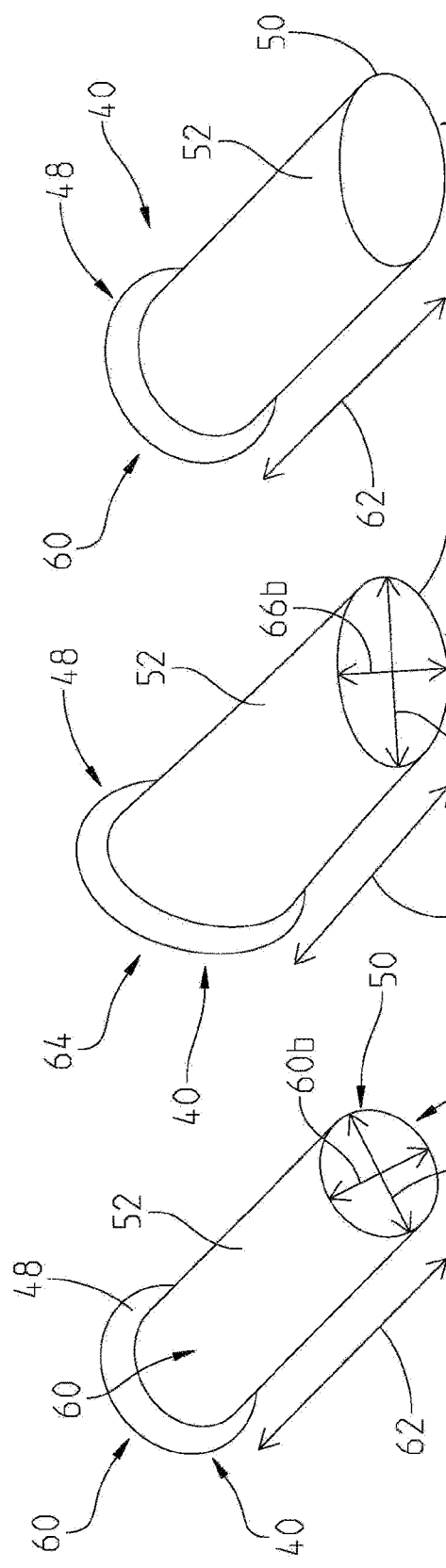
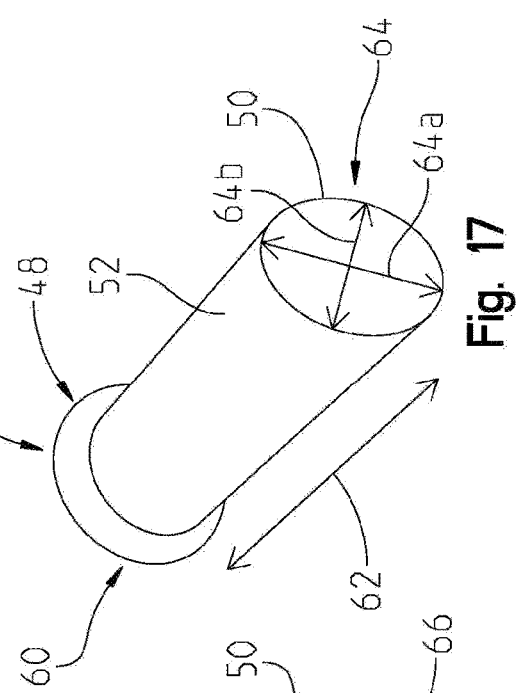
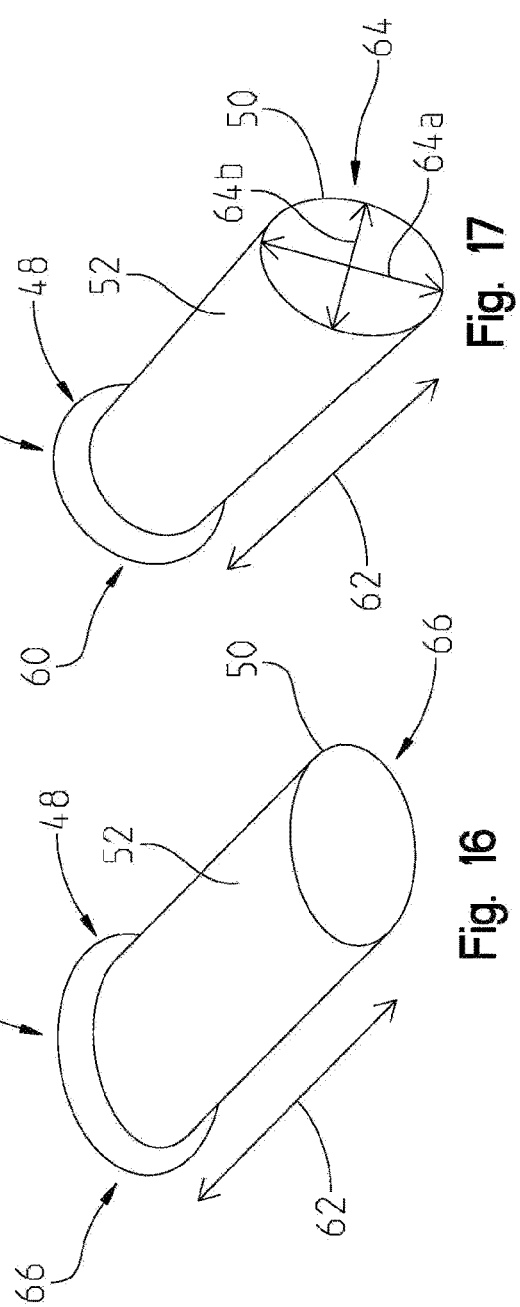

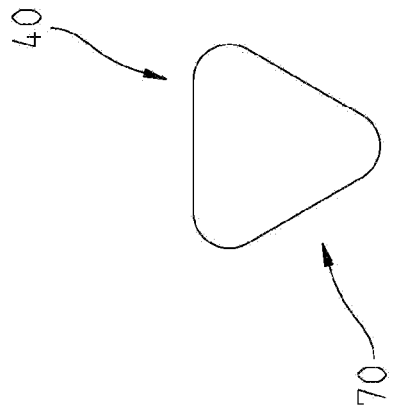
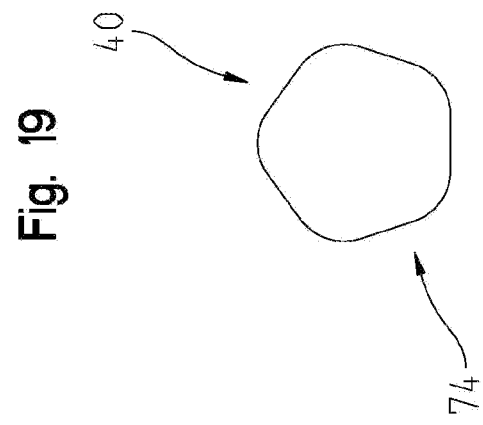
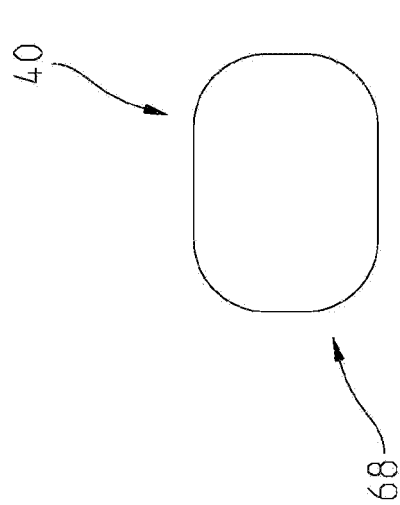

FUEL INJECTOR HAVING MULTIPLE ROWS OF SPRAY HOLES WITH DIFFERENT CROSS-SECTIONAL SHAPES FOR FLOW MODULATION

CROSS-REFERENCE TO RELATED APPLICATION

This present application is a national phase filing of International Application No. PCT/US2021/017520, filed on Feb. 11, 2021, which claims priority to U.S. Provisional Application No. 62/983,999, filed on Mar. 2, 2020, and entitled "FUEL INJECTOR HAVING MULTIPLE ROWS OF SPRAY HOLES WITH DIFFERENT CROSS-SECTIONAL SHAPES FOR FLOW MODULATION," the complete disclosures disclosure of which are expressly incorporated by reference herein.

FIELD OF THE INVENTION

The present disclosure relates to a fuel injector, and more particularly, to a fuel injector having spray holes with different cross-sectional shapes for fuel control and modulation.

BACKGROUND OF THE DISCLOSURE

Fuel injectors are provided on combustion engines to control fuel flow during a fuel injection event when the engine is operating. Various embodiments of fuel injectors may include multiple rows (e.g., two) of spray holes within the nozzle body of the fuel injector. The angle and flow of the fuel may be controlled based on parameters of the spray holes.

Depending on the operating conditions of the fuel injector, there may be a difference in fuel flow between the rows of spray holes, which can lead to unexpected flow or spray results and possibly preferential cavitation and structural damage. As such, there is a need to provide a fuel injector and/or injection method which controls/modulates flow through the rows of spray holes.

SUMMARY OF THE DISCLOSURE

In one embodiment, a nozzle body of a fuel injector comprises a proximal end, a distal end spaced apart from the proximal end, and at least one spray hole positioned at the distal end. The at least one spray hole includes an inlet having a first cross-sectional shape and an outlet having a second cross-sectional shape different from the first cross-sectional shape.

In a further embodiment, a nozzle body of a fuel injector comprises a nozzle sac having a first row of spray holes and a second row of spray holes. A cross-sectional shape of the spray holes in the first row is different from the cross-sectional shape of the spray holes in the second row.

BRIEF DESCRIPTION OF THE DRAWINGS

The above mentioned and other features of this invention, and the manner of attaining them, will become more apparent and, the invention itself will be better understood by reference to the following description of embodiments of the invention taken in conjunction with the accompanying drawings, where:

FIG. 13 is a perspective view of one of the first or prior art embodiment spray holes of FIGS. 3 and 4;

FIG. 14 is a perspective view of one of the second embodiment spray holes of FIGS. 5 and 6;

FIG. 15 is a perspective view of one of the third embodiment spray holes of FIGS. 7 and 8;

FIG. 16 is a perspective view of one of the fourth embodiment spray holes of FIGS. 9 and 10;

FIG. 17 is a perspective view of one of the fifth embodiment spray holes of FIGS. 11 and 12

FIG. 18 is a cross-sectional view of a sixth embodiment spray hole of the nozzle body of FIG. 2;

FIG. 19 is a cross-sectional view of a seventh embodiment spray hole of the nozzle body of FIG. 2;

FIG. 20 is a cross-sectional view of an eighth embodiment spray hole of the nozzle body of FIG. 2; and FIG. 21 is a cross-sectional view of a ninth embodiment spray hole of the nozzle body of FIG. 2.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Figure 1:
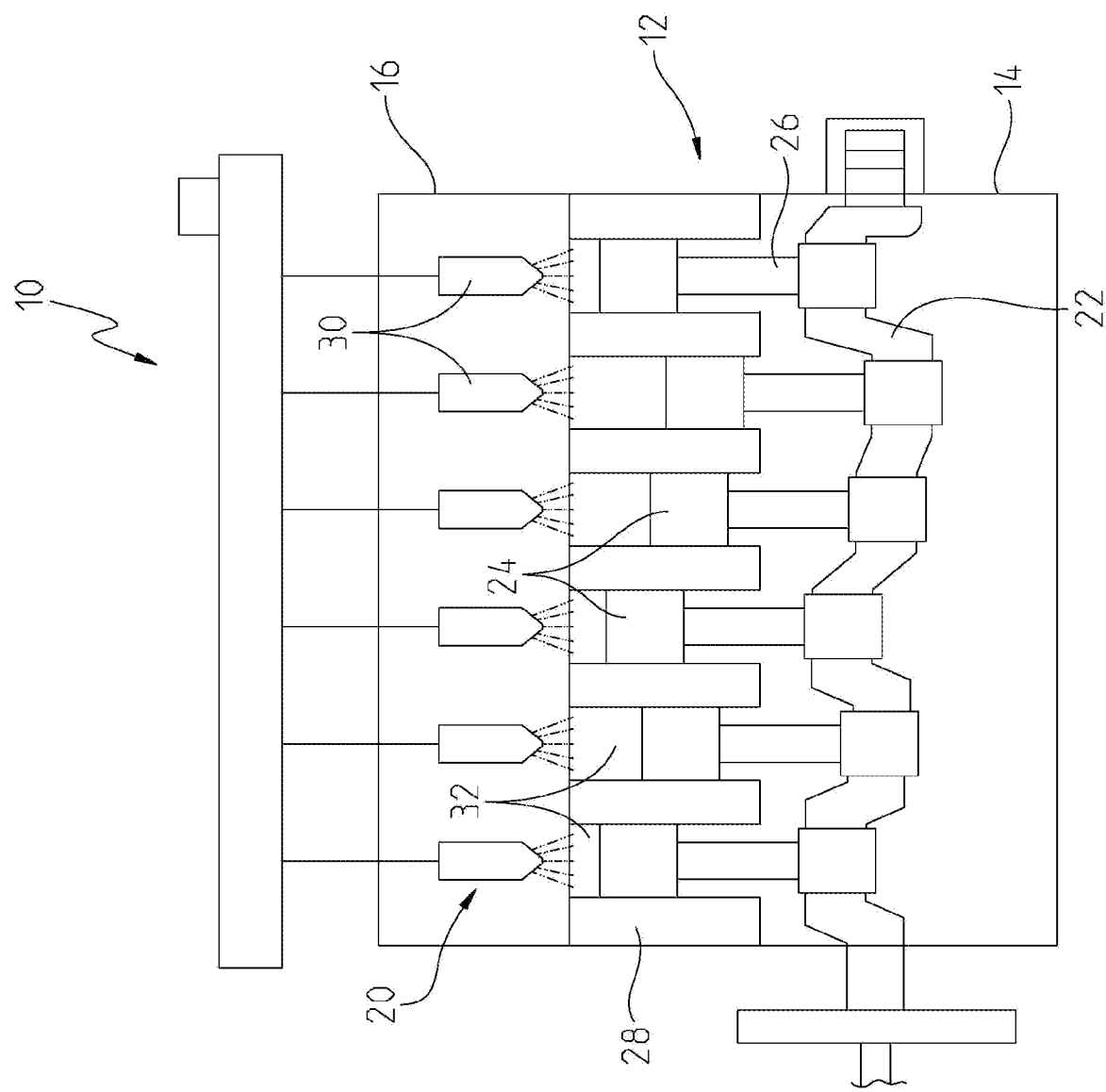
FIG. 1 is a schematic of an internal combustion engine incorporating an illustrative embodiment of a fuel injector of the present disclosure.

Referring to FIG. 1, a portion of an internal combustion engine 10 is shown as a simplified schematic. Engine 10 includes an engine body 12, which supports an engine block 14, a cylinder head 16 coupled to engine block 14, and a fuel system 20. Engine body 12 further includes a crankshaft 22, a plurality of pistons 24, and a plurality of connecting rods 26. Pistons 24 are configured for reciprocal movement within a plurality of engine cylinders 28, with one piston 24 positioned in each engine cylinder 28. Each piston 24 is operably coupled to crankshaft 22 through one of connecting rods 26. A plurality of combustion chambers 32 are each defined by one piston 24, cylinder head 16, and cylinder 28. The movement of pistons 24 under the action of a combustion process in engine 10 causes connecting rods 26 to move crankshaft 22.

When engine 10 is operating, a combustion process occurs in combustion chambers 32 to cause movement of pistons 24. The movement of pistons 24 causes movement of connecting rods 26, which are drivingly connected to crankshaft 22, and movement of connecting rods 26 causes rotary movement of crankshaft 22. The angle of rotation of crankshaft 22 may be measured by the control system to aid in timing the combustion events in engine 10 and for other purposes. The angle of rotation of crankshaft 22 may be measured in a plurality of locations, including a main crank pulley (not shown), an engine flywheel (not shown), an engine camshaft (not shown), or on crankshaft 22.

Fuel system 20 includes a plurality of fuel injectors 30 positioned within cylinder head 16. Each fuel injector 30 is fluidly coupled to one combustion chamber 32. In operation, fuel system 20 provides fuel to fuel injectors 30, which is then injected into combustion chambers 32 by the action of fuel injectors 30, thereby forming one or more injection events or cycles. As detailed further herein, the injection cycle may be defined as the interval that begins with the movement of a nozzle or needle element to permit fuel to flow from fuel injector 30 into an associated combustion chamber 32, and ends when the nozzle or needle element moves to a position to block the flow of fuel from fuel injector 30 into combustion chamber 32.

Crankshaft 22 drives at least one fuel pump to pull fuel from the fuel tank in order to move fuel toward fuel injectors 30. A control system (not shown) provides control signals to fuel injectors 30 that determine operating parameters for each fuel injector 30, such as the length of time fuel injectors 30 operate and the number of fueling pulses per a firing or injection cycle period, thereby determining the amount of fuel delivered by each fuel injector 30.

In addition to fuel system 20, the control system controls, regulates, and/or operates other components of engine 10 that may be controlled, regulated, and/or operated through a control system (not shown). More particularly, the control system may receive signals from sensors located on engine 10 and transmit control signals or other inputs to devices located on engine 10 in order to control the function of such devices. The control system may include a controller or control module (not shown) and a wire harness (not shown). Actions of the control system may be performed by elements of a computer system or other hardware capable of executing programmed instructions, for example, a general purpose computer, special purpose computer, a workstation, or other programmable data processing apparatus. These various control actions also may be performed by specialized circuits (e.g., discrete logic gates interconnected to perform a specialized function), by program instructions (software), such as logical blocks, program modules, or other similar applications which may be executed by one or more processors (e.g., one or more microprocessors, a central processing unit (CPU), and/or an application specific integrated circuit), or any combination thereof. For example, embodiments may be implemented in hardware, software, firmware, middleware, microcode, or any combination thereof. Instructions may be in the form of program code or code segments that perform necessary tasks and can be stored in a non-transitory, machine-readable medium such as a storage medium or other storage(s) A code segment may represent a procedure, function, subprogram, program, routine, subroutine, module, software package, class, or any combination of instructions, data structures, or program statements. A code segment may be coupled to another code segment or a hardware circuit by passing and/or receiving information, data, arguments, parameters, or memory contents. In this way, the control system is configured to control operation of engine 10, including fuel system 20.

Figure 2:
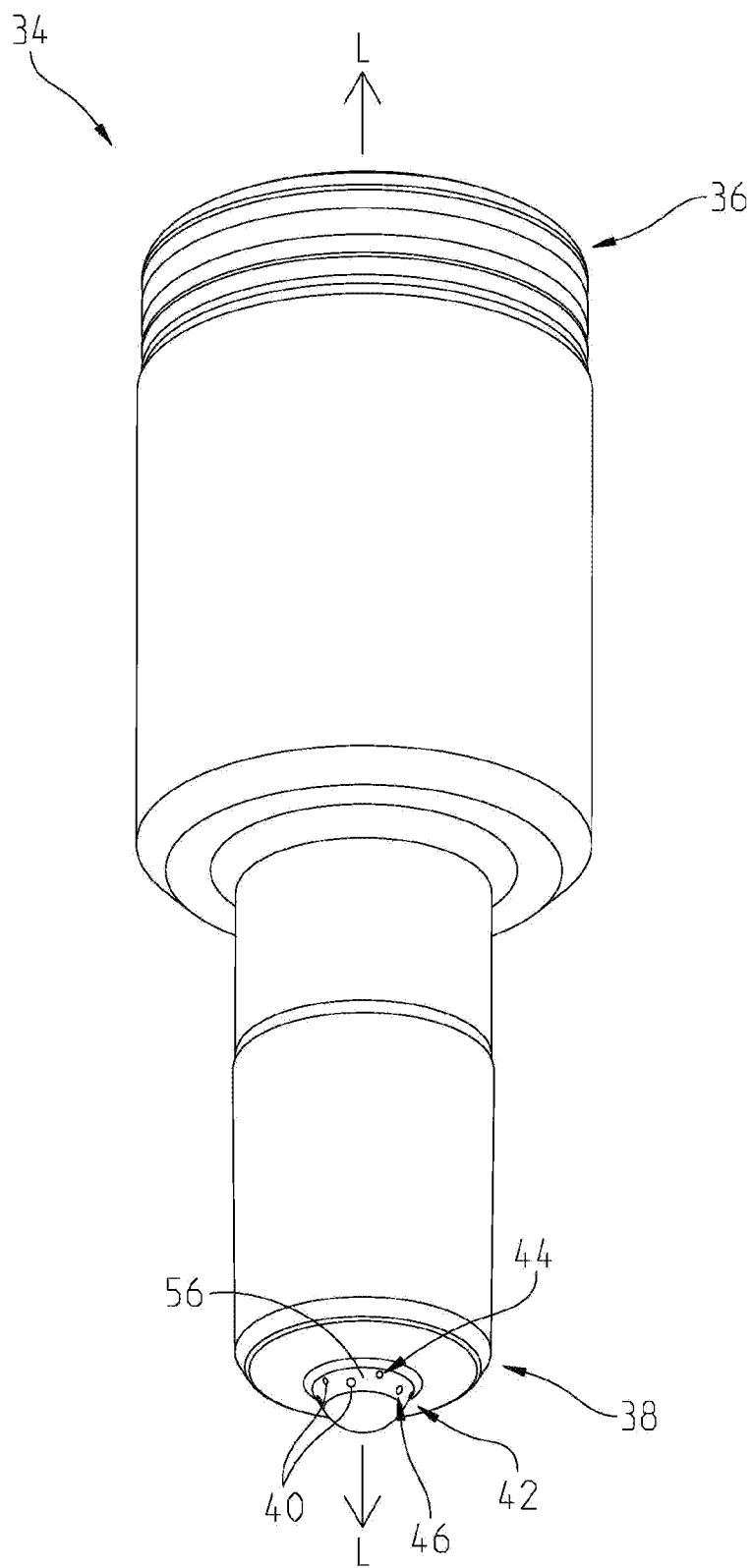
FIG. 2 is a perspective view of a nozzle body of the fuel injector of FIG. 1.

Referring to FIG. 2, fuel injector 30 includes a nozzle or valve body 34 having a proximal end 36 and a distal end 38. A plurality of spray holes 40 is positioned longitudinally (i.e., along longitudinal axis L) between proximal end 36 and distal end 38 of nozzle body 34. Distal end 38 of nozzle body 34 includes a nozzle sac or tip 42, Illustratively, spray holes 40 are spaced apart from each other along the entire circumference of nozzle sac 42. In various embodiments, spray holes 40 may be equally spaced apart from each other, however, in other embodiments, at least a portion of spray holes 40 may be closer to each other compared to others of spray holes 40. In other words, in various embodiments, spray holes 40 may be clustered together along a particular portion of nozzle sac 42.

Referring still to FIG. 2, spray holes 40 may be positioned in a plurality of rows. While spray holes 40 are shown in two rows, illustratively a first or upper row 44 and a second or lower row 46 positioned longitudinally below a portion of first row 44, other embodiments of spray holes 40 may include a single row or more than two rows. For example, nozzle body 34 may include three of more rows of spray holes 40. It may be appreciated that the illustrative embodiments disclosed herein are not limited to two rows of spray holes 40 and, instead, are applicable to a nozzle body 34 having any number of spray holes 40. Within rows 44 and 46, spray holes 40 may be located at any position relative to each other and relative to the circumference of nozzle sac 42.

Figure 3:
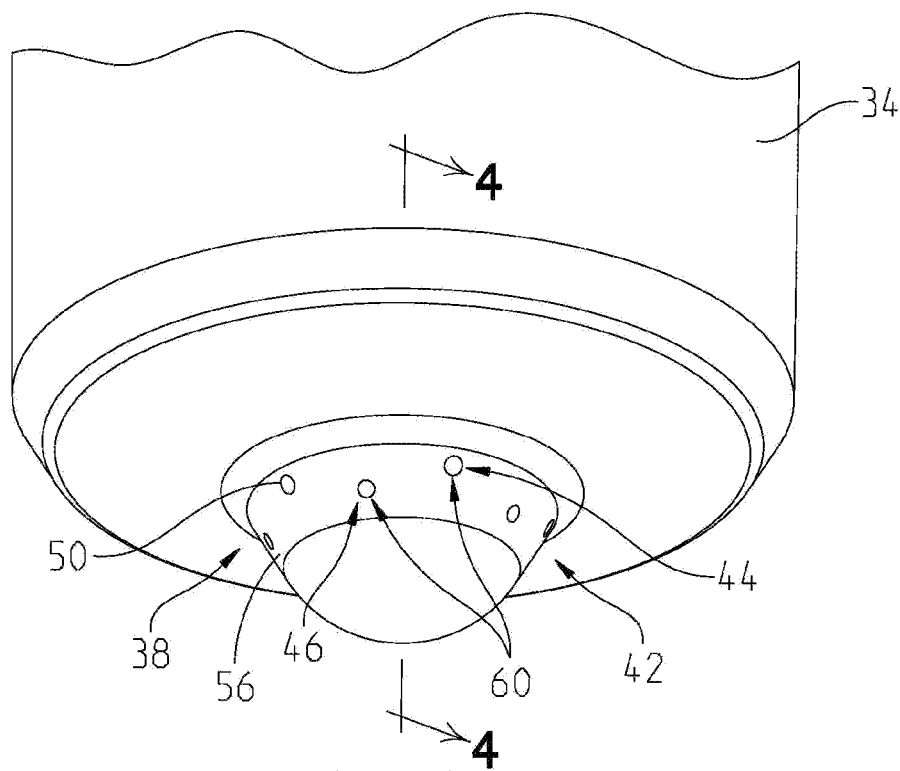
FIG. 3 is a detailed perspective view of a first or prior art embodiment of spray holes of the nozzle body of FIG. 2.
Figure 4:
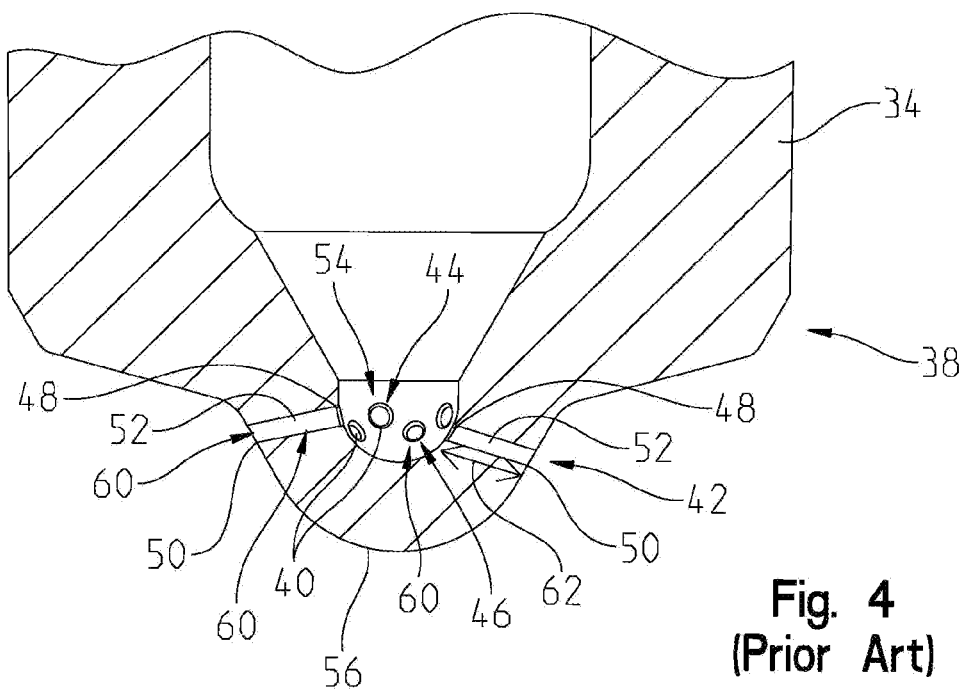
FIG. 4 is a cross-sectional view of the nozzle body of FIG. 3, taken along line 4-4 of FIG. 3.

As shown in FIGS. 3 and 4, each spray hole 40 includes an inlet 48, an outlet 50, and a channel or flow passage 52 extending therebetween. Illustratively, inlet 48 is adjacent and open to an open volume 54 (configured to receive fuel) of nozzle sac 42 while outlet 50 is positioned at and defines an opening of an outer or exterior surface 56 of nozzle sac 42. Channel 52 is angled relative to longitudinal axis L (FIG. 2) and may be angled 0-90° relative to longitudinal axis L, depending on the application of fuel injector 30. The orientation of channel 52 defines the spray angle of spray hole 40 and spray holes 40 may have the same spray angle or may have different spray angles relative to each other.

Figure 11:
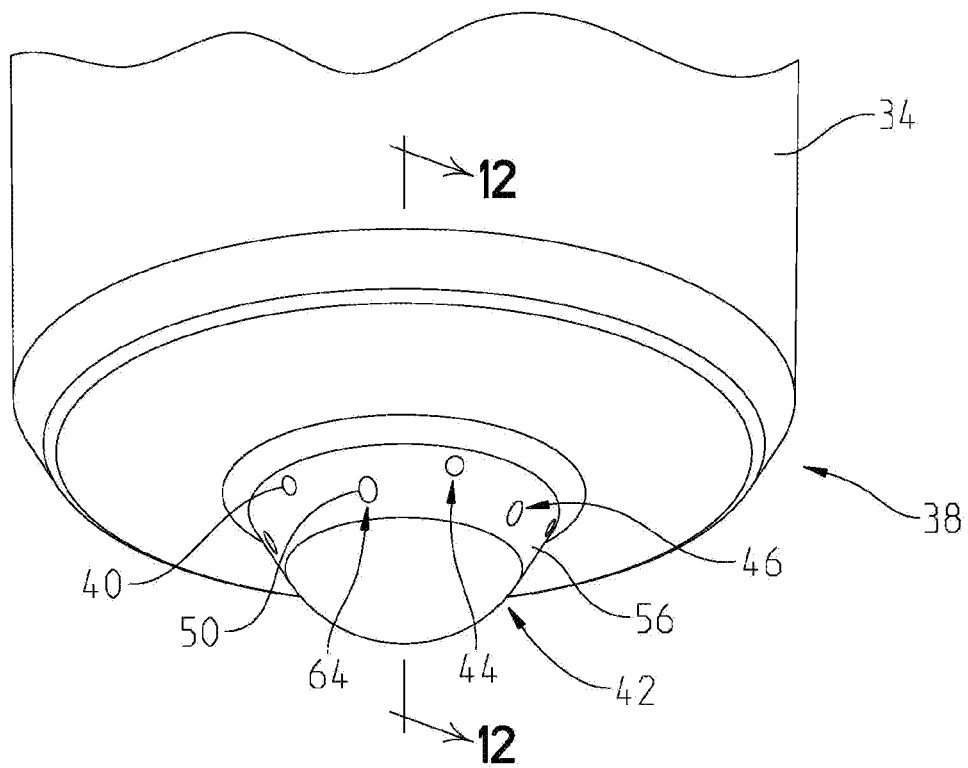
FIG. 11 is a detailed perspective view of a fifth embodiment of spray holes of the nozzle body of FIG. 2.

FIGS. 3, 4, and 13 illustrate a prior art embodiment of nozzle sac 42 in that a cross-sectional shape of spray holes 40 in first row 44 is the same as a cross-sectional shape of spray holes 40 in second row 46. Additionally, as shown in FIGS. 3,4, and 11, a cross-sectional shape of inlet 48 is the same as a cross-sectional shape of outlet 50 in both rows 44, 46 of spray holes 40. More particularly, and as shown best in FIG. 13, inlet 48 has a circular cross-sectional shape 60 in both rows 44, 46 while outlet 50 also has circular cross-sectional shape 60 in both rows 44, 46. In this way, both inlet and outlet 48, 50 have the same cross-sectional shape and all spray holes 40 in both rows 44, 46 have the same cross-sectional shape as each other. Because both inlet 48 and 50 have circular cross-sectional shape 60, channel 52 extending therebetween also has circular cross-sectional shape 60. In one embodiment, channel 52 has a constant diameter along an entire length 62 of channel 52 equal to the diameter of inlet and outlet 48, 50. It may be appreciated that circular cross-sectional shape 60 is defined by a circle having a major axis 60$a$ and a minor axis 60$b$, where a length of major axis 60$a$ is equal to a length of minor axis 60$b$.

The prior art configuration of spray holes 40 in FIGS. 3, 4, and 13 may lead to preferential cavitation in second row 46 of spray holes 40 and, therefore, may result in structural damage to nozzle sac 42 at second row 46. More particularly, using computational fuel dynamics ("CFD"), at various operating parameters (e.g., a low lift position of a plunger (not shown)) of fuel injector 30, the flow of fuel through nozzle body 34 is disproportionately higher through second row 46 of spray holes 40 because of the arrangement of spray holes 40 relative to a bottom of nozzle sac 42. The internal shape of the plunger and the fuel dynamics associated with fuel entering nozzle sac 42 contributes to this disproportionate flow through second row 46, which may negatively affect operation of fuel injector 30 and/or combustion within engine 10. For example, if fuel flow is disproportionately concentrated at second row 46 during certain operating conditions of fuel injector 30, the expected combustion within each cylinder 28 (FIG. 1) may not occur. Additionally, this concentrated fuel flow through second row 46 at certain operating parameters (e.g., low plunger lift) potentially increase the risk of cavitation at second row 46 but the fuel flow.

Figure 5:
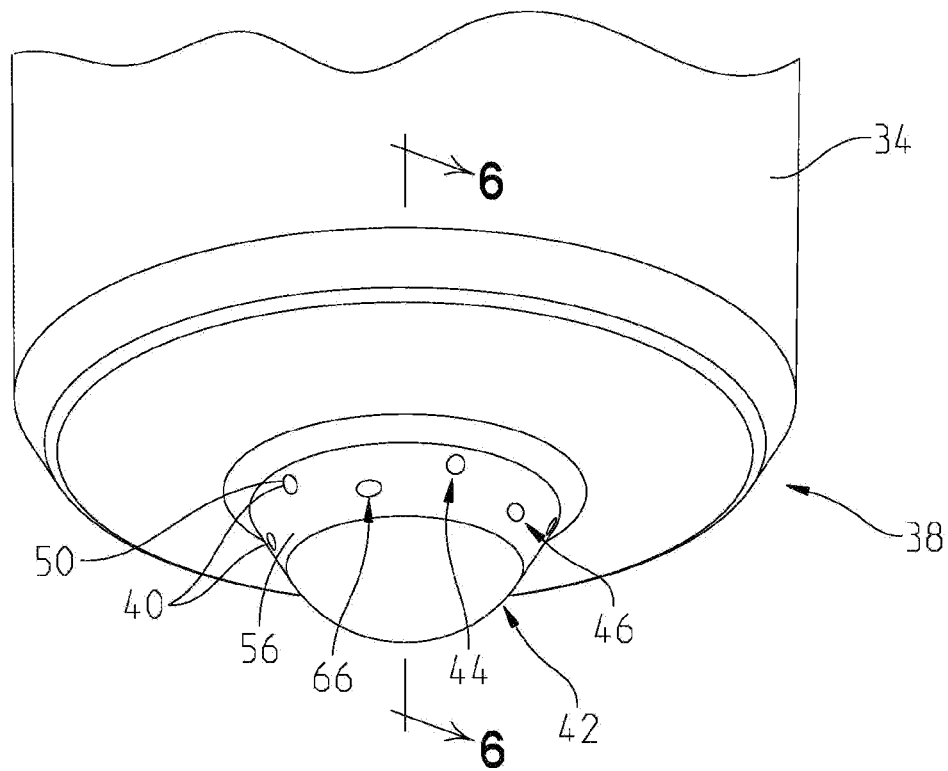
FIG. 5 is a detailed perspective view of a second embodiment of spray holes of the nozzle body of FIG. 2.
Figure 6:
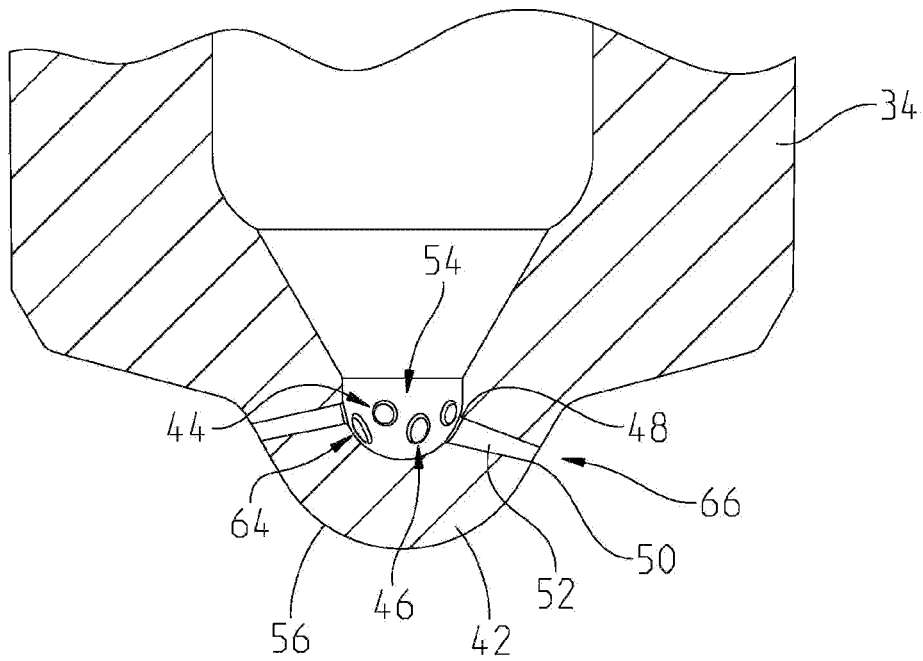
FIG. 6 is a cross-sectional view of the nozzle body of FIG. 5, taken along line 6-6 of FIG. 5.

As such, FIGS. 5-12 and 14-17 disclose various embodiments to address these issues of the prior art embodiment of FIGS. 3, 4, and 13 by illustrating that the cross-sectional shape of spray holes 40 in second row 46 may different from that in first row 44 and/or that the cross-sectional shape of inlet 48 may be different from that of outlet 50 for spray holes 40 in second row 46. As shown in FIGS. 5, 6, and 14, spray holes 40 in first row 44 may define circular cross-sectional shape 60 at inlet 48 and outlet 50, while spray holes 40 in second row 46 may have a non-circular, illustratively an elliptical, cross-sectional shape and, therefore, have a cross-sectional shape different from that of spray holes 40 in first row 44.

More particularly, inlet 48 of spray holes 40 of second row 46 have a vertically-oriented elliptical shape 64 and outlet 50 of spray holes 40 of second row 46 have a horizontally-oriented elliptical shape 66. Vertically-oriented elliptical shape 64 has a major axis 64a in a vertical direction which is longer than a minor axis 64b extending perpendicularly (e.g., horizontally) relative to major axis 64a (FIG. 17) Horizontally-oriented elliptical shape 66 has a major axis 66a in a horizontal direction which is longer than a minor axis 66b extending perpendicularly (e.g., vertically) relative to major axis 66a (FIG. 14). As such, it is apparent that the cross-sectional shape of spray holes 40 in second row 46 is different from the cross-sectional shape of spray holes 40 in first row 44 because the major and minor axes of an ellipse are different from that of a circle. It may be appreciated that the cross-sectional characterization of spray holes 40 in second row 46 is defined based on the cross-sectional shape at outlet 50 when compared to the cross-sectional shape of spray holes 40 in first row 44.

Referring still to FIGS. 5, 6, and 14, because the cross-sectional shape at inlet 48 of spray holes 40 in second row 46 is different from that at outlet 50 of spray holes 40 in second row 46, there is a transition in shape between vertically-oriented elliptical shape 64 and horizontally-oriented elliptical shape 66 along length 62 of channel 52. In this way, channel 52 may not have a constant diameter along length 62 and, instead, may have a varying diameter along length 62.

Figure 7:
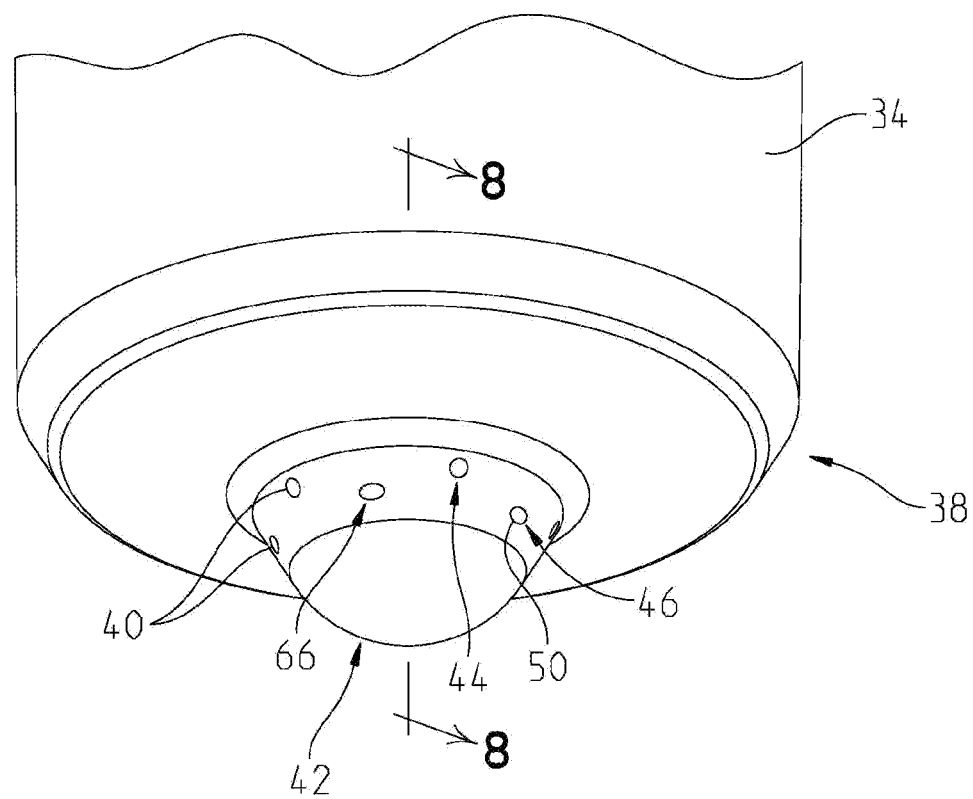
FIG. 7 is a detailed perspective view of a third embodiment of spray holes of the nozzle body of FIG. 2.
Figure 8:
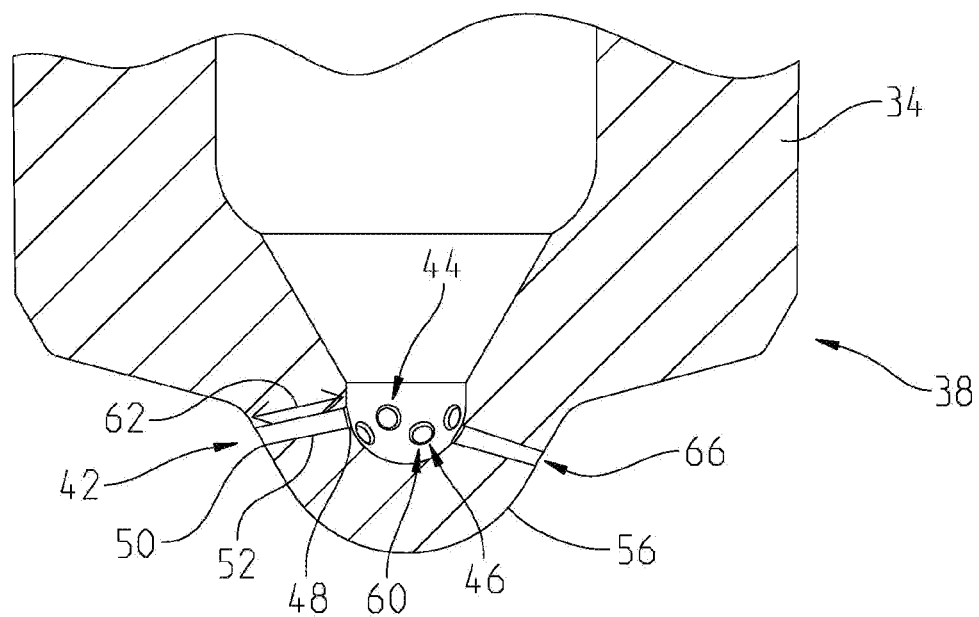
FIG. 8 is a cross-sectional view of the nozzle body of FIG. 7, taken along line 8-8 of FIG. 7.

Referring to FIGS. 7, 8, and 15, spray holes 40 in first row 44 may define circular cross-sectional shape 60 at inlet 48 and outlet 50. Inlet 48 of spray holes 40 in second row 46 also may have circular cross-sectional shape 60, however, illustratively, outlet 50 of spray holes 40 in second row 46 may have horizontally-oriented elliptical shape 66. Because the cross-sectional shape at inlet 48 of spray holes 40 in second row 46 is different from that at outlet 50 of spray holes 40 in second row 46, there is a transition between circular cross-sectional shape 60 and horizontally-oriented elliptical shape 66 along length 62 of channel 52. In this way, channel 52 may not have a constant diameter along length 62.

Figure 9:
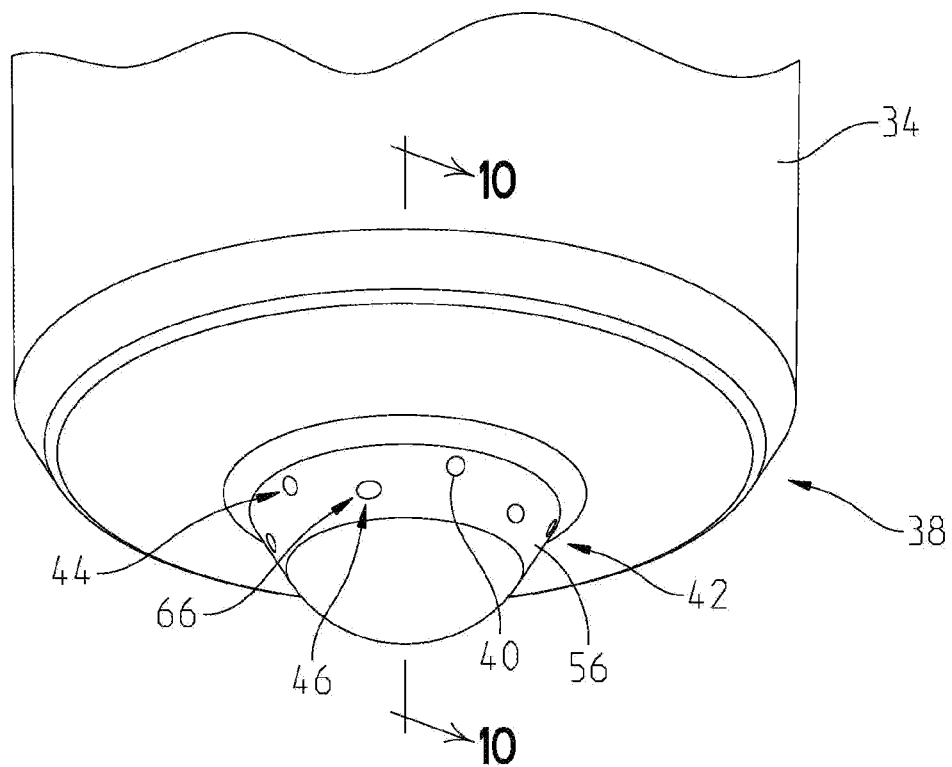
FIG. 9 is a detailed perspective view of a fourth embodiment of spray holes of the nozzle body of FIG. 2.
Figure 10:
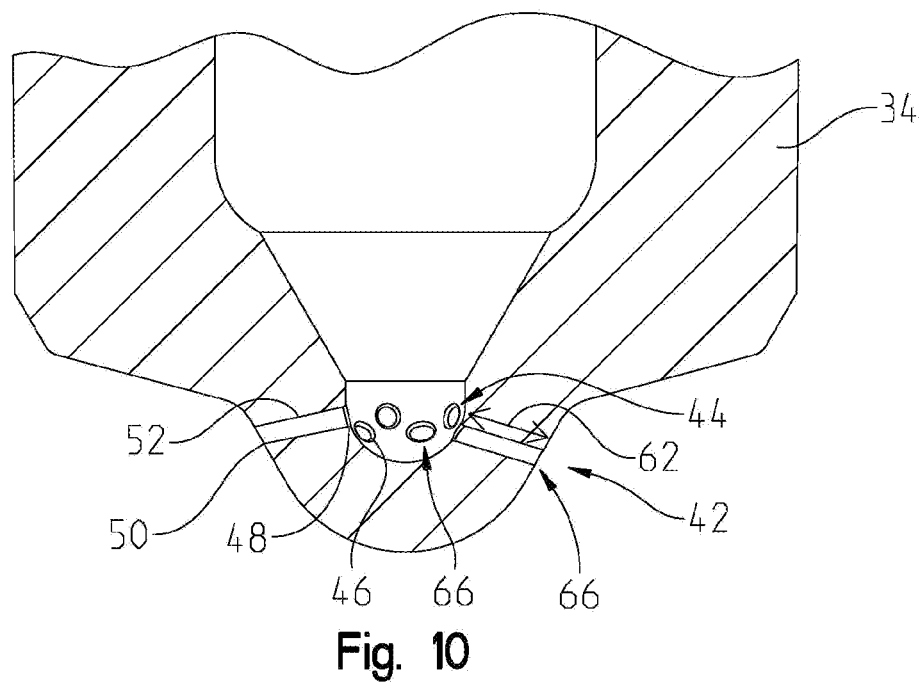
FIG. 10 is a cross-sectional view of the nozzle body of FIG. 9, taken along line 10-10 of FIG. 9.

Referring to FIGS. 9, 10, and 16, spray holes 40 in first row 44 may define circular cross-sectional shape 60 at inlet 48 and outlet 50; however, spray holes 40 of second row 46 may define horizontally-oriented elliptical shape 66 at inlet 48 and outlet 50. In this embodiment, there is no difference in the cross-sectional shape at inlet 48 of spray holes 40 in second row 46 and, as such, channel 52 may have a constant diameter along length 62.

Figure 12:
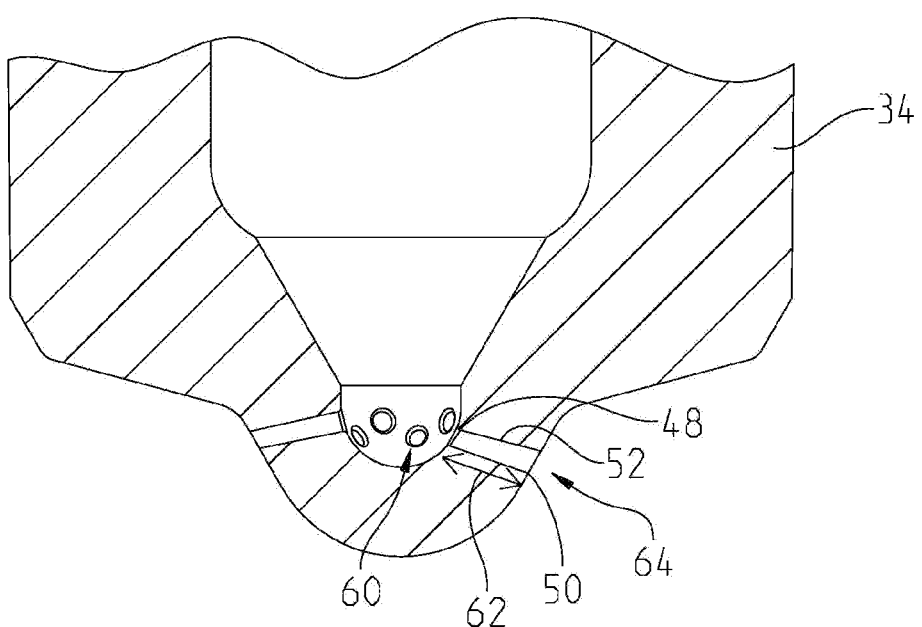
FIG. 12 is a cross-sectional view of the nozzle body of FIG. 11, taken along line 12-12 of FIG. 11.

Referring to FIGS. 11, 12, and 17, spray holes 40 in first row 44 may define circular cross-sectional shape 60 at inlet 48 and outlet 50. Inlet 48 of spray holes 40 of second row 46 also may have circular cross-sectional shape 60, however, illustratively, outlet 50 of spray holes 40 of second row 46 may have vertically-oriented elliptical shape 64. Because the cross-sectional shape at inlet 48 of spray holes 40 in second row 46 is different from that at outlet 50 of spray holes 40 in second row 46, there is a transition between circular cross-sectional shape 60 and vertically-oriented elliptical shape 64 along length 62 of channel 52. In this way, channel 52 may not have a constant diameter along length 62.

The different cross-sectional shapes of spray holes 40 in rows 44 and 46, as shown in embodiments of FIGS. 5-12 and 14-17, are configured to modulate flow through spray holes 40 because the different cross-sectional shapes have different coefficients of discharge. For example, certain applications or parameters of engine 10 may desire to have disproportionate flow through one of rows 44 or 46 compared to the other, or it may be desirable to ensure that, the same fuel flow occurs through both rows 44 and 46 during all operating conditions of engine 10. As such, the various embodiments of spray holes 40 disclosed herein in FIGS. 5-12 and 14-21 allow for flow control from nozzle body 34 and allow for the potential to customize the flow from nozzle body 34, In this way, the differences in cross-sectional shapes may allow for increased engine efficiency and reduced engine emissions because fuel injector 30 (FIG. 1) may be able to achieve higher or greater fuel flows, Additionally, by being able to control the flow through spray holes 40, the embodiments of FIGS. 5-12 and 14-17 are configured to compensate for the tendency to concentrate the flow through spray holes 40 of second row 46 at various operating parameters of fuel injector 30 (e.g., when the plunger is in a low lift position), thereby decreasing the likelihood of preferential cavitation at second row 46.

More particularly, the mass flow through one of spray holes 40 may be approximated using Equation (1):

$$m = C_d * \rho * A * V \tag{1}$$

where m is the mass flow, $C_d$ is the coefficient of discharge, p is the density of the fuel, A is the cross-sectional area of channel 52, and V is the mean velocity related to the pressure drop across spray hole 40. The coefficient of discharge $C_d$ takes into account viscous/frictional losses and is known to be a strong function of the cross-sectional shape of spray hole 40. From Equation (1) it is apparent that the different cross-sectional shapes of spray holes 40 affect coefficient of discharge $C_d$, cross-sectional area A, and mean velocity V such that mass flow m is clearly dependent on the cross-sectional shape of spray hole 40. As such, the use of different cross-sectional shapes for spray holes 40 allows for control/modulation of fuel mass flow, optimization of spray characteristics, and better control of cavitation. For example, as noted herein, at certain operating parameters of fuel injector 30 (e.g., low lift position of the plunger), the fuel flow may be disproportionately concentrated at second row 46 compared to that at first row 44, so if it is desired to have the same fuel flow at both first and second rows 44, 46 or some other configuration of flow from first and second rows 44, 46, the cross-sectional shape of rows 44, 46 may be changed to be different from each other and/or include different cross-sectional shapes at inlet 48 compared to outlet 50.

It is envisioned that the above benefits of the embodiments of FIGS. 5-12 and 14-17 may be achieved if at least a portion (i.e., not all) of spray holes 40 in second row 46 have a different cross-sectional shape compared to spray holes 40 in first row 44. Additionally, although various embodiments of FIGS. 5-12 and 14-17 illustrate both a cross-sectional shape difference in spray holes 40 in rows 44 and 46 and a cross-sectional shape difference at inlet 48 and outlet 50 in second row 46, the above benefits also may be achieved if the cross-sectional shape of spray holes 40 in second row 46 is different from the cross-sectional shape of spray holes 40 in first row 44 but both inlet 48 and outlet 50 of spray holes 40 in second row 46 are the same.

While spray holes 40 are shown having a circular cross-sectional shape, a vertically-oriented elliptical cross-sectional shape, and/or a horizontally-oriented elliptical cross-sectional shape, other cross-sectional shapes, such as those shown in FIGS. 18-21, are envisioned. For example, as shown in FIG. 18, a rounded rectangular cross-sectional shape 68 may be used at inlet 48 and/or outlet 50 of spray hole 40 in first row 44 and/or second row 46. Additionally, as shown in FIG. 19, a rounded triangular cross-sectional shape 70 may be used at inlet 48 and/or outlet 50 of spray hole 40 in first row 44 and/or second row 46. Also, as shown in FIGS. 20 and 21, rounded polygonal cross-sectional shapes 72 and 74 may be used at inlet 48 and/or outlet 50 of spray hole 40 in first row 44 and/or second row 46. As such, the cross-sectional shape of spray holes 40 may have any number of sides or may be configured as any shape having rounded surfaces and are still accounted for according to Equation (1).

Additionally, for the embodiments shown in FIGS. 5-12 and 14-17, each row 44, 46 may have 10 spray holes 40, thereby utilizing a 1:1 ratio of spray holes 40 in first and second rows 44, 46. However, in other embodiments, any number of spray holes 40 may be included in first and second rows 44, 46 and the ratio of spray holes 40 in first row 44 compared to the number of spray holes 40 in second row 46 may be varied. Further, the size of spray holes 40 may be determined based on the size of engine 10, the fueling parameters for engine 10, and many other factors. In the embodiments of FIGS. 5-12 and 14-17, each spray hole 40 has a minimum diameter of approximately 100 μm.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains,

What is claimed is:

1. A nozzle body of a fuel injector, comprising:
a proximal end;
a distal end spaced longitudinally apart from the proximal end; and
a first row of spray holes positioned at the distal end and a second row of spray holes positioned at the distal end longitudinally spaced apart from the first row of spray holes, the first row of spray holes including one or more spray holes having a uniform cross-sectional shape defined by a circle from an inlet end to an outlet end thereof and the second row of spray holes including one or more spray holes that include an inlet having a first cross-sectional shape and an outlet having a second cross-sectional shape different from the first cross-sectional shape, wherein a channel extending between the inlet and outlet in the second row of spray holes includes a transition in cross-sectional shape from the inlet to the outlet, wherein the first and second cross-sectional shapes of the one or more spray holes in the second row of spray holes are configured to reduce disproportionate flow of the fuel flow from the second row of spray holes relative to the first row of spray holes.

2. The nozzle body of claim 1, wherein the first cross-sectional shape is one of circular, elliptical, rounded rectangular, rounded triangular, or rounded polygonal.

3. The nozzle body of claim 1, wherein the second cross-sectional shape is one of elliptical, rounded rectangular, rounded triangular, or rounded polygonal.

4. The nozzle body of claim 1, wherein the first cross-sectional shape is circular and the second cross-sectional shape is one of vertically-oriented elliptical or horizontally-oriented elliptical.

5. The nozzle body of claim 1, wherein the first cross-sectional shape is vertically-oriented elliptical and the second cross-sectional shape is horizontally-oriented elliptical.

6. The nozzle body of claim 1, wherein the uniform cross-section of the one or more spray holes in the first row of spray holes and the first and second cross-sectional shapes of the one or more spray holes in the second row of spray holes are configured so that fuel flow from the first row of spray holes and fuel flow from the second row of spray holes decreases preferential cavitation of the fuel flow from the second row of spray holes to provide a same fuel flow through the first row of spray holes and through the second row of spray holes during all operating conditions.

7. The nozzle body of claim 1, wherein each of the spray holes in the first row of spray holes has a uniform cross-section from the inlet end to the outlet end thereof that is defined by a circle.

8. The nozzle body of claim 1, wherein the first cross-sectional shape of the inlet of the one or more spray holes in the second row of spray holes is defined by a circle and the second cross-sectional shape of the outlet is one of elliptical, rounded rectangular, rounded triangular, or rounded polygonal.

9. The nozzle body of claim 1, wherein the second row of spray holes is spaced longitudinally from the first row of spray holes toward the distal end of the nozzle body.

10. A nozzle body of a fuel injector, comprising:
a nozzle sac having a first row of spray holes and a second row of spray holes spaced longitudinally below the first row of spray holes, wherein a cross-sectional shape of the spray holes in the first row is different from a cross-sectional shape of the spray holes in the second row so that fuel flow from the first row of spray holes and fuel flow from the second row of spray holes decreases preferential cavitation to reduce disproportionate flow of the fuel flow from the second row of spray holes relative to the first row of spray holes, wherein a channel extending between an inlet and an outlet in the second row of spray holes includes a transition in cross-sectional shape from the inlet to the outlet.

11. The nozzle body of claim 10, wherein the cross-sectional shape of spray holes in the first row is circular and the cross-sectional shape of spray holes in the second row is one of elliptical, rounded rectangular, rounded triangular, or rounded polygonal.

12. The nozzle body of claim 11, wherein the first row defines an upper row and the second row defines a lower row positioned longitudinally below the first row.

13. The nozzle body of claim 10, wherein the inlet defines a different cross-sectional shape than that of the outlet.

14. The nozzle body of claim 13, wherein the channel has a varying diameter along a length thereof.

15. The nozzle body of claim 10, wherein the inlet of the at least one spray hole in the second row is defined by a circle and the outlet of the at least one spray hole in the second row is one of elliptical, rounded rectangular, rounded triangular, or rounded polygonal.

16. The nozzle body of claim 10, wherein a number of spray holes in the first row is equal to a number of spray holes in the second row.

17. The nozzle body of claim 16, wherein the number of spray holes is 10 spray holes.

18. The nozzle body of claim 10, wherein the cross-sectional shape of each spray hole in the first row of spray holes is defined by a circle from an inlet end thereof to an outlet end thereof.

19. The nozzle body of claim 10, wherein the cross-sectional shape of only part of the spray holes in the second row is different than the cross-sectional shape of the spray holes in the first row.

20. The nozzle body of claim 10, wherein a coefficient of discharge of the cross-sectional shape of the spray holes in the second row is configured to provide a same fuel flow from the second row of spray holes as the first row of spray holes under all operating conditions.

* * * * *